United States Patent
Fu et al.

(10) Patent No.: US 9,178,438 B2
(45) Date of Patent: Nov. 3, 2015

(54) APPARATUS FOR RESONANT CONVERTERS

(71) Applicant: FutureWei Technologies, Inc., Plano, TX (US)

(72) Inventors: Dianbo Fu, Plano, TX (US); Hengchun Mao, Plano, TX (US); Heping Dai, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 397 days.

(21) Appl. No.: 13/857,834

(22) Filed: Apr. 5, 2013

(65) Prior Publication Data

US 2013/0265804 A1  Oct. 10, 2013

Related U.S. Application Data

(60) Provisional application No. 61/620,876, filed on Apr. 5, 2012.

(51) Int. Cl.
*H02M 1/12* (2006.01)
*H02M 3/335* (2006.01)
*H02M 1/00* (2007.01)

(52) U.S. Cl.
CPC .. *H02M 3/33576* (2013.01); *H02M 2001/0058* (2013.01); *Y02B 70/1433* (2013.01); *Y02B 70/1491* (2013.01)

(58) Field of Classification Search
CPC ..... H02M 3/33576; H02M 1/12; H02M 1/14; H02M 1/15; H02M 1/4208; H02M 1/126; H02M 1/4266; H02M 1/4225; H02M 1/143; H02M 1/45; H02M 7/5395; H02M 7/527; H02M 7/49; H02M 7/53873; H02M 7/483; H02M 7/53875; H02M 7/53871; H02M 7/497; H02M 7/06; H02M 7/48
USPC ............ 363/15–17, 24–26, 39–48, 125, 127, 363/131–134
See application file for complete search history.

(56) References Cited

U.S. PATENT DOCUMENTS

| | | | | |
|---|---|---|---|---|
| 4,053,820 | A * | 10/1977 | Peterson et al. | 363/44 |
| 5,668,707 | A * | 9/1997 | Barrett | 363/44 |
| 5,768,111 | A * | 6/1998 | Zaitsu | 363/15 |
| 6,535,407 | B1 * | 3/2003 | Zaitsu | 363/126 |
| 7,742,318 | B2 | 6/2010 | Fu et al. | |
| 8,467,200 | B2 * | 6/2013 | Pan et al. | 363/21.02 |
| 2010/0110741 | A1 * | 5/2010 | Lin et al. | 363/127 |
| 2011/0103097 | A1 * | 5/2011 | Wang et al. | 363/17 |
| 2014/0346962 | A1 * | 11/2014 | Sanders et al. | 315/193 |

* cited by examiner

*Primary Examiner* — Adolf Berhane
*Assistant Examiner* — Kevin H Sprenger
(74) *Attorney, Agent, or Firm* — Slater & Matsil, L.L.P.

(57) ABSTRACT

A converter comprises a bridge and a resonant tank coupled between the bridge and an isolation transformer. The converter is configured such that the converter operates at a first constant-gain resonant frequency during a normal operation condition wherein a voltage gain of the converter is essentially insensitive to an output load change and the converter operates at a minimum-gain damping frequency during an abnormal operation condition wherein a voltage gain of the converter is approximately equal to zero.

20 Claims, 14 Drawing Sheets

APPARATUS FOR RESONANT CONVERTERS

This application claims the benefit of U.S. Provisional Application No. 61/620,876, filed on Apr. 5, 2012, entitled "Apparatus for Resonant Converters," which application is hereby incorporated herein by reference.

TECHNICAL FIELD

The present invention relates to a resonant converter, and, in particular embodiments, to a multiple constant gain resonant apparatus for bus converter applications.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters and the like.

As known in the art, bridge converters generally are employed when the power of a DC-DC converter is more than 100 watts. A bridge converter may comprise a primary bridge, a transformer and a secondary rectifier. In particular, a full bridge is formed by four switches and a half bridge is formed by two switches. The primary bridge is further coupled between an input voltage source and the primary side of the transformer. The secondary side may comprise a full wave rectifier coupled to a center-tapped second winding.

The full bridge converter described above may have large magnetic components. In order to reduce the size of the magnetic components such as the transformer and the output inductor, the switching frequency may be increased to a higher level so as to reduce the transformer and the inductor in size. Consequently, the power density of a full bridge converter can be increased substantially. However, as the switching frequency of full bridge converters increases, the total efficiency is reduced due to extra switching losses in response to a higher switching frequency. Therefore, there is a need to have a soft switching full bridge converter to reduce switching losses.

A phase-shift full bridge converter may reduce the switching losses by employing a zero voltage switching technique. However, the primary side may have a large amount of current stress due to the primary side switches' longer conduction time of the primary current having an amplitude close to the peak current during a freewheeling period, and the reverse recovery of second switches' body diodes may cause further power losses.

FIG. 1 (prior art) illustrates a conventional full bridge converter having a full wave rectifier coupled to a center-tapped secondary winding. The full bridge converter 100 includes four switches Q1, Q2, Q3 and Q4 at a primary side of a transformer Tx. The four switches Q1, Q2, Q3 and Q4 form a bridge having two legs. Q1 and Q3 in series connection have a common node, referred to as A. Q2 and Q4 in series connection have a common node, referred to as B. The primary winding of the transformer Tx is connected to A and B. A dc supply Vin is connected to the two legs to provide power to the full bridge converter 100.

According to the operating principle of a hard switching full bridge converter, the switches Q1 and Q4 are turned on simultaneously for an adjustable time during a first half cycle. After a period of dead time, the switches Q2 and Q3 are turned on simultaneously for an equal time during the second half cycle. As a result, Vin and −Vin are applied to the primary side of the transformer Tx in alternate half periods.

In a fixed duty cycle control scheme, the turn-on time of the switches Q1 and Q4 is equal to the turn-on time of the switches Q2 and Q3. When all four switches are turned off, both S1 and S2 are turned on. The load current flows through S1 and S2. This interval is referred to as a freewheeling period. The output voltage of the bridge converter 100 is proportional to the turn-on time of the switches. A controller (not shown) may detect the output voltage Vo and adjust the turn-on time via a negative feedback control loop (not shown).

The secondary side of the transformer Tx is center-tapped. Such a center-tapped secondary and two switches S1 and S2 can form a full wave rectifier, which can convert the primary voltage having double polarities (Vin and −Vin) of the transformer Tx to a secondary voltage having a single polarity. Then, the secondary voltage having a single polarity is fed to an output filter including an inductor Lo and an output capacitor Co. The output filter averages the square voltage pulses at the output of the full wave rectifier and generates a DC voltage at Vo, which is then supplied to a load represented by a resistor $R_L$.

A phase shift full bridge converter is capable of reducing switching losses by means of the zero voltage switching control technique. As shown in a dashed rectangle 120 of FIG. 1, instead of turning on two primary switches (e.g., Q1 and Q4) simultaneously, the turn-on time of these two switches are shifted by a period of time. More particularly, as depicted in the dashed rectangle 120, a waveform 106 and a waveform 110 show Q1 is on for a period of time before Q4 is turned on. There is an overlap between Q1's turn-on time and Q4's turn-on time. After Q1 is turned off, Q4 stays on for a period of time. Likewise, a waveform 107 and a waveform 111 show there is a phase shift between Q2 and Q3's turn-on time.

The phase shift full bridge can achieve zero voltage switching by utilizing the L-C resonance between transformer leakage inductance and MOSFET (e.g., Q1) output capacitance. For example, Q3 has a parasitic capacitor (not shown) across its drain and source. During the period when both Q1 and Q4 are on, the voltage across Q3's parasitic capacitor is charged to a voltage approximately equal to Vin. According to the basic principle of the phase shift control technique, Q1 is off prior to Q4. After Q1 is off, the primary side current cannot change instantaneously. As a result, the primary side current will flow through the parasitic capacitors of Q1 and Q3. The flow of the primary side current through both parasitic capacitors may cause the voltage at the junction between Q1 and Q3 to be discharged to zero, enabling zero voltage switching when Q3 is turned on without substantial power losses. Similarly, the phase shift operation may enable a lossless turn-on process of other switches, namely Q1, Q2 and Q4.

SUMMARY OF THE INVENTION

These and other problems are generally solved or circumvented, and technical advantages are generally achieved, by preferred embodiments of the present invention which provide an apparatus for resonant converters. In particular embodiments, a multiple constant gain converter discloses an effective power topology to reduce the current stress and improve the current limit of a resonant converter.

In accordance with an embodiment, a converter comprises a bridge including at least two switches coupled between an input voltage source and an isolation transformer, a resonant tank and a secondary rectifier coupled to the isolation transformer comprising at least two switches, wherein a dead time is placed between a first gate signal of a first switch of the secondary rectifier and a second gate signal of a second switch of the secondary rectifier.

The resonant tank is coupled to the bridge comprising five resonant components, wherein the five resonant components are configured to provide a first constant-gain resonant frequency, and wherein a voltage gain of the converter is essentially insensitive to an output load change when the converter operates at the first constant-gain resonant frequency, a minimum-gain damping frequency, and wherein a ratio of the minimum-gain damping frequency to the first constant-gain resonant frequency is in a range from about one and half to three and a voltage gain of the converter is approximately equal to zero when the converter operates at the minimum-gain damping frequency and a second constant-gain resonant frequency, and wherein the second constant-gain resonant frequency is higher than the minimum-gain damping frequency.

In accordance with another embodiment, an apparatus comprises a resonant tank coupled between a bridge and a primary side of a transformer of a multiple constant gain resonant converter, wherein the resonant tank comprises a first capacitor connected in series with a first inductor to form a first resonant device, a second capacitor connected in parallel with the first resonant device, a second inductor connected in series with the primary side of the transformer and a magnetizing inductance of the transformer.

The magnetizing inductance, the second inductor, the second capacitor and the first resonant device are configured such that the resonant tank provides a first constant-gain resonant frequency, and wherein a voltage gain of the multiple constant gain resonant converter is essentially insensitive to an output load change when the multiple constant gain resonant converter operates at the first constant-gain resonant frequency, a minimum-gain damping frequency, and wherein a voltage gain of the multiple constant gain resonant converter is approximately equal to zero when the multiple constant gain resonant converter operates at the minimum-gain damping frequency and a second constant-gain resonant frequency, and wherein the second constant-gain resonant frequency is higher than the minimum-gain damping frequency.

The apparatus further comprises a secondary rectifier coupled to a secondary side of the transformer, wherein a switching frequency of the secondary rectifier is approximately equal to the first constant-gain resonant frequency.

In accordance with yet another embodiment, a method comprises providing a resonant tank coupled to a bridge and a primary side of a transformer of a power converter, wherein the resonant tank comprises a first resonant component connected in series with a second resonant component to form a first resonant device, a third resonant component connected in parallel with the first resonant device, a fourth resonant component connected in series with the primary side of the transformer and a fifth resonant component connected in parallel with the primary side of the transformer.

The method further comprises in a normal operation condition, configuring the first resonant component, the second resonant component, the third resonant component, the fourth resonant component and the fifth resonant component such that the power converter operates at a first constant-gain resonant frequency, wherein at the first constant-gain resonant frequency, a voltage gain of the power converter is essentially insensitive to an output load change and in an abnormal operation condition, configuring the first resonant component, the second resonant component, the third resonant component, the fourth resonant component and the fifth resonant component such that the power converter operates at a minimum-gain damping frequency, wherein, at the minimum-gain damping frequency, a voltage gain of the converter is approximately equal to zero.

An advantage of an embodiment of the present invention is that a resonant tank of a multiple constant gain converter helps to reduce the current stress and improve the current limit of a resonant converter. As a result, the resonant tank of the multiple constant gain converter helps to improve the efficiency, reliability and cost of the resonant converter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a multiple constant gain resonant converter used as a bus converter. The invention may also be applied, however, to a variety of power conversion applications. Hereinafter, various embodiments will be explained in detail with reference to the accompanying drawings.

Figure 2:
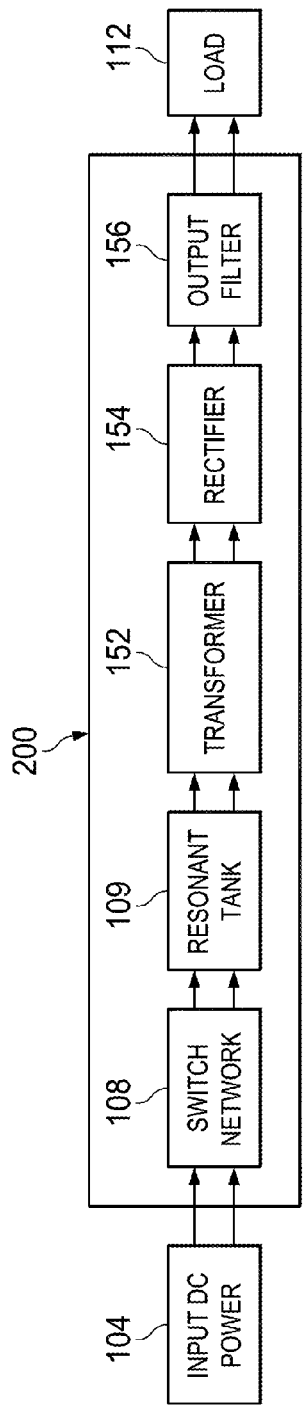
FIG. 2 illustrates a block diagram of a multiple constant gain resonant converter in accordance with various embodiments of the present disclosure.

FIG. 2 illustrates a block diagram of a multiple constant gain resonant converter in accordance with various embodiments of the present disclosure. The multiple constant gain resonant converter 200 is coupled between an input dc power source 104 and a load 112. The input dc power source 104 may be telecommunication power supplies converting a utility line voltage to a dc voltage. Alternatively, the input dc power source 104 may be a solar panel array. Furthermore, the input dc power source 104 may be an energy storage device such as rechargeable batteries, fuel cells and/or the like. The load 112 represents the power consumed by a circuit coupled to the multiple constant gain resonant converter 200. Alternatively, the load 112 may refer to downstream converters coupled to the output of the multiple constant gain resonant converter 200.

The multiple constant gain resonant converter 200 may comprise a switch network 108, a resonant tank 109, a transformer 152, a rectifier 154 and an output filter 156. As shown in FIG. 2, the switch network 108, the resonant tank 109, the transformer 152, the rectifier 154 and the output filter 156 are coupled to each other and connected in cascade between the input dc power source 104 and the load 112.

The switch network 108 may comprise primary side switches of a full bridge resonant converter according to some embodiments. Alternatively, the switch network 108 may be of the primary side switches of other bridge converters such as a half-bridge resonant converter, a push-pull resonant converter and the like. The detailed configuration of the switch network 108 will be described below with respect to FIG. 3.

The resonant tank 109 may be implemented in a variety of ways. For example, the resonant tank 109 may comprise five resonant elements such as inductors and capacitors. In some embodiments, the resonant tank comprises a first series resonant inductor and a first series resonant capacitor. The resonant tank may further comprise a first parallel inductor, a parallel capacitor and a second parallel inductor.

The first series resonant inductor and the first parallel resonant inductor may be implemented as external inductors. The second parallel inductor may be implemented as a magnetizing inductance of the transformer.

The configuration of the resonant tank 109 described above is merely an example. There may be many variation, alternatives and modifications. For example, the first series resonant inductor may be implemented as a leakage inductance of the transformer 152. In addition, the second parallel inductor may be implemented as a separate inductor connected in parallel with the primary side of the transformer 152. The detailed schematic diagram of the resonant tank 109 will be described below with respect to FIG. 3.

The multiple constant gain resonant converter 200 may further comprise a transformer 152, a rectifier 154 and an output filter 156. The transformer 152 provides electrical isolation between the primary side and the secondary side of the multiple constant gain resonant converter 200. In accordance with an embodiment, the transformer 152 may be formed of two transformer windings, namely a primary transformer winding and a secondary transformer winding. Alternatively, the transformer 152 may have a center tapped secondary so as to have three transformer windings including a primary transformer winding, a first secondary transformer winding and a second secondary transformer winding.

It should be noted that the transformers illustrated herein and throughout the description are merely examples, which should not unduly limit the scope of the claims. One of ordinary skill in the art would recognize many variations, alternatives, and modifications. For example, the transformer 152 may further comprise a variety of bias windings and gate drive auxiliary windings.

The rectifier 154 converts an alternating polarity waveform received from the output of the transformer 152 to a single polarity waveform. When the transformer 152 is of a center tapped secondary, the rectifier 154 may be formed of a pair of switching elements such as n-type metal oxide semiconductor (NMOS) transistors. Alternatively, the rectifier 154 may be formed of a pair of diodes. On the other hand, when the transformer is of a single secondary winding, the rectifier 154 may be a full-wave rectifier coupled to the single secondary winding of the transformer 152.

Furthermore, the rectifier 154 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 154 are well known in the art, and hence are not discussed herein.

The output filter 156 is used to attenuate the switching ripple of the multiple constant gain resonant converter 200. According to the operation principles of isolated dc/dc converters, the output filter 156 may be an L-C filter formed by an inductor and a plurality of capacitors. One person skilled in the art will recognize that some isolated dc/dc converter topologies such as forward converters may require an L-C filter.

On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 156 are within various embodiments of the present disclosure.

Figure 3:
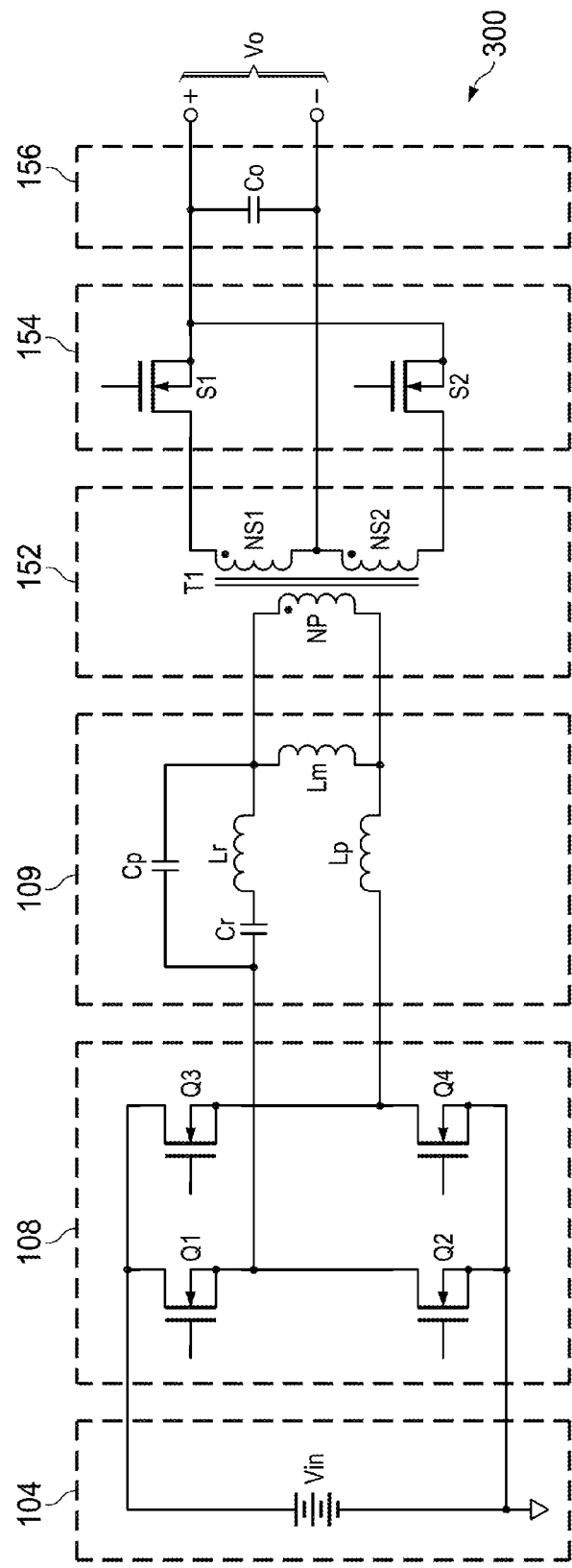
FIG. 3 illustrates a schematic diagram of a first illustrative embodiment of the multiple constant gain resonant converter shown in FIG. 2 in accordance with various embodiments of the present disclosure.

FIG. 3 illustrates a schematic diagram of a first illustrative embodiment of the multiple constant gain resonant converter shown in FIG. 2 in accordance with various embodiments of the present disclosure. The multiple constant gain resonant converter 300 includes a switch network 108, a resonant tank 100, a transformer 152, a rectifier 154 and an output filter 156 as shown in FIG. 3. In addition, these portions of multiple constant gain resonant converter 300 are connected in cascade as shown in FIG. 3.

The switch network 108 includes four switching elements, namely Q1, Q2, Q3 and Q4. As shown in FIG. 3, a first pair of switching elements Q1 and Q2 are connected in series. A second pair of switching elements Q3 and Q4 are connected in series. The common node of the switching elements Q1 and Q2 is coupled to a first input terminal of the resonant tank 109. Likewise, the common node of the switching elements Q3 and Q4 is coupled to a second input terminal of the resonant tank 109.

The switching elements Q1, Q2, Q3 and Q4 form a primary side switching network of a full bridge converter. According to some embodiments, switching elements Q1, Q2, Q3 and Q4 are implemented as MOSFET or MOSFETs connected in parallel.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like. The detailed operation principles of the switch network 108 will be described below with respect to FIGS. 4-6.

It should be noted that while the example throughout the description is based upon a full bridge multiple constant gain resonant converter (e.g., full bridge resonant converter 300 shown in FIG. 3), the multiple constant gain resonant converter 300 shown in FIG. 3 may have many variations, alternatives, and modifications. For example, any suitable power converters such as half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 3 illustrates four switches Q1, Q2, Q3, and Q4, various embodiments of the present disclosure may include other variations, modifications and alternatives. For example, a separate capacitor may be connected in parallel with each switch of the primary side switching network 108. Such a separate capacitor helps to better control the timing of the resonant process of the multiple constant gain resonant converter 300.

FIG. 3 shows that the resonant tank 109 is formed by a resonant inductor Lr, a resonant capacitor Cr, a parallel inductance Lp, a parallel capacitor Cp and the magnetizing inductance Lm of the transformer 152. As shown in FIG. 3, the resonant inductor Lr and the resonant capacitor Cr are connected in series and further coupled between a first terminal of the primary side of the transformer 152 and a common node of the switches Q1 and Q2. The parallel inductor Lp is coupled between a second terminal of the primary side of the transformer 152 and a common node of the switches Q3 and Q4. The parallel capacitor Cp is coupled between the first terminal of the primary side of the transformer 152 and the common node of the switches Q1 and Q2.

Figure 1:
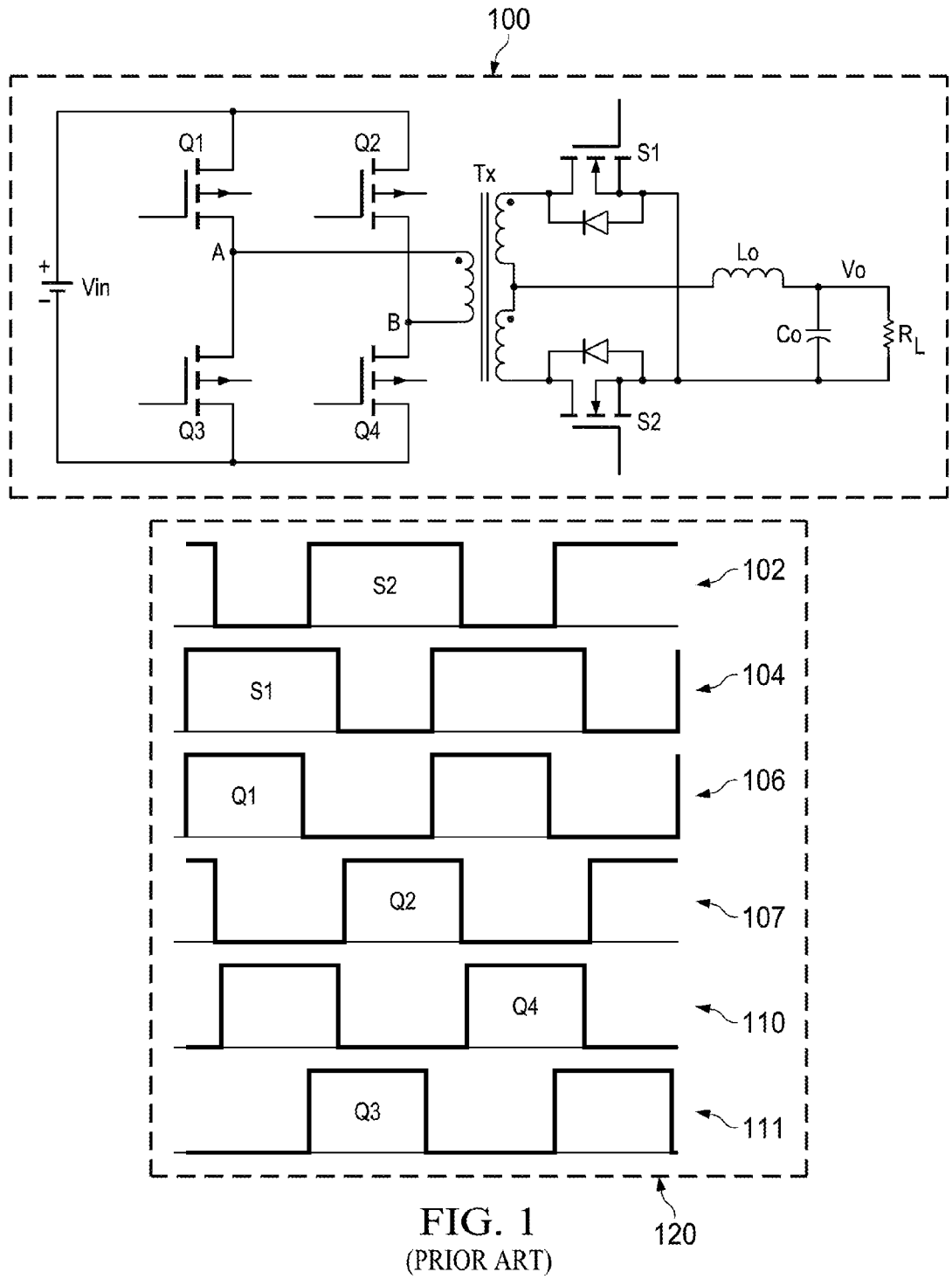
FIG. 1 illustrates a conventional full bridge converter having a full wave rectifier coupled to a center-tapped secondary winding.

As shown in FIG. 1, Cr and Lr are connected in series to form a series resonant device. Lp and Cp may function as a parallel resonant device. In addition, the series resonant device, Lm and the parallel resonant device are connected in series to provide a hybrid resonance frequency. In other words, the resonant process of the full bridge converter may include multiple resonant frequencies.

The resonant tank shown in FIG. 3 may lead to a first resonant frequency and a second resonant frequency. Both the first resonant frequency and the second resonant frequency are determined by the values of the resonant elements described above.

It should be noted that Lm or Lr may not be an independent component. In fact, Lm in part or in whole can be the magnetizing inductance of the transformer of the full bridge converter. Likewise, Lr in part or in whole can be the leakage inductance of the transformer. In addition, Lm may not contribute to the amplitude of the resonant current of the full bridge converter as the secondary switches may connect at least one of the secondary windings of the transformer to the output essentially all the time during normal operation. Instead, Lm may help to improve the soft switching characteristics of the primary switches (e.g., Q1) during the dead time (not shown but illustrated in FIG. 4) between S1 and S2.

The transformer 152 may be of a primary winding NP, a first secondary winding NS1 and a second secondary winding NS2. The primary winding NP is coupled to the resonant tank 109 as shown in FIG. 3. The secondary windings are coupled to the load 112 through the rectifier 154.

It should be noted the transformer structure shown in FIG. 3 is merely an example. One person skilled in the art will recognize many alternatives, variations and modification. For example, the transformer 152 may be a non-center tapped transformer coupled between the primary side switching network and the rectifier 154. The secondary side employs a full-wave rectifier formed by four switching elements. The operation principle of a rectifier coupled to a center tapped transformer secondary side is well known, and hence is not discussed in further detail herein.

It should be noted that the power topology of the multiple constant gain resonant converter 300 may be not only applied to a rectifier as shown in FIG. 3, but also applied to other secondary configurations, such as voltage doubler rectifiers, current doubler rectifiers and/or the like.

It should further be noted that the resonant tank 109 shown in FIG. 3 is merely an example, which should not unduly limit the scope of the claims. One of ordinary skill in the art would recognize many variations, alternatives, and modifications. For example, the resonant tank 109 can be implemented by a plurality of alternative embodiments, which are shown in FIGS. 11-16.

Figure 4:
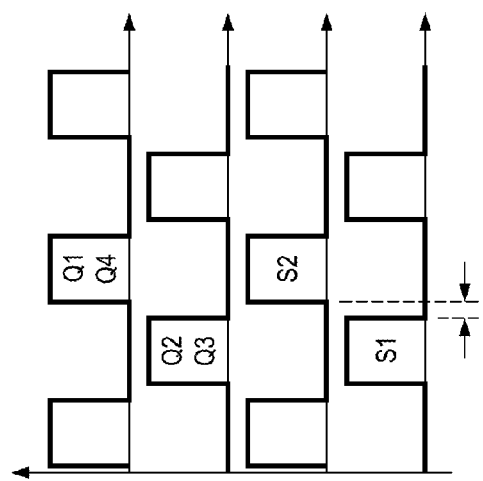
FIG. 4 illustrates the gate control signals of the primary side switches and the secondary side switches of the multiple constant gain resonant converter shown in FIG. 3 in accordance with various embodiments of the present disclosure.

FIG. 4 illustrates the gate control signals of the primary side switches and the secondary side switches of the multiple constant gain resonant converter shown in FIG. 3 in accordance with various embodiments of the present disclosure. According to the operating principle of a full bridge converter, Q1, Q2, Q3 and Q4 are switching at a frequency approximately equal to the first resonant frequency described above with respect to FIG. 3. In addition, each switch (e.g., Q1) is operating a duty cycle approximately equal to 50%. It should be noted that the control scheme of each switch may be a fixed frequency PWM control scheme or a phase shift PWM control scheme.

Referring back to FIG. 3, the secondary side rectifier is formed by S1 and S2. The gate drive signal of S1 is not complementary to the gate drive signal of S2. As shown in FIG. 4, there may be a dead time td between the gate drive of S1 and the gate drive of S2. It should be noted, as shown in FIG. 4, the gate drive signal of S1 is in phase with the gate drive signals of Q2 and Q3. On the other hand, the gate drive signal of S2 is in phase with the gate drive signals of Q1 and Q4.

In practical designs, there may also be an insignificant delay between the gate signals of primary switches and their corresponding secondary switch to optimize the switch stress and power conversion efficiency. Also, snubber circuits, such as RC snubbers or RCD snubbers commonly used in power supplies, can be employed to further reduce the stress of the secondary switches.

In some embodiments, a $3^{rd}$ harmonic current can be injected into the multiple constant gain resonant converter by controlling the operation principle of the secondary side switches S1 and S2. In particular, the secondary side switches such as S1 and S2 shown in FIG. 3 may be forced to generate a harmonic voltage. For example, S1's turn-on period may be not in sync with its body diode. In other words, S1 may keep a turn-on state after its body diode is in reverse bias. Such a non-sync operation may cause a short at the secondary side of the transformer. Such a short may generate a harmonic voltage on the transformer. In sum, S1 and S2 do not form a synchronous rectifier.

It should be noted that the gate control signals of the primary side switches and the secondary side switches of the multiple constant gain resonant converter may be generated by a plurality of controllers. In accordance some embodiments, there may be a primary controller generating primary side control signals and a second controller generating secondary side control signals.

Furthermore, the control scheme of the multiple constant gain resonant converter may be an open loop control scheme, a closed loop control scheme and any combinations thereof. On the other hand, the output of the multiple constant gain resonant converter may be fully regulated, unregulated and/or semi-regulated depending on different design needs and applications.

Figure 5:
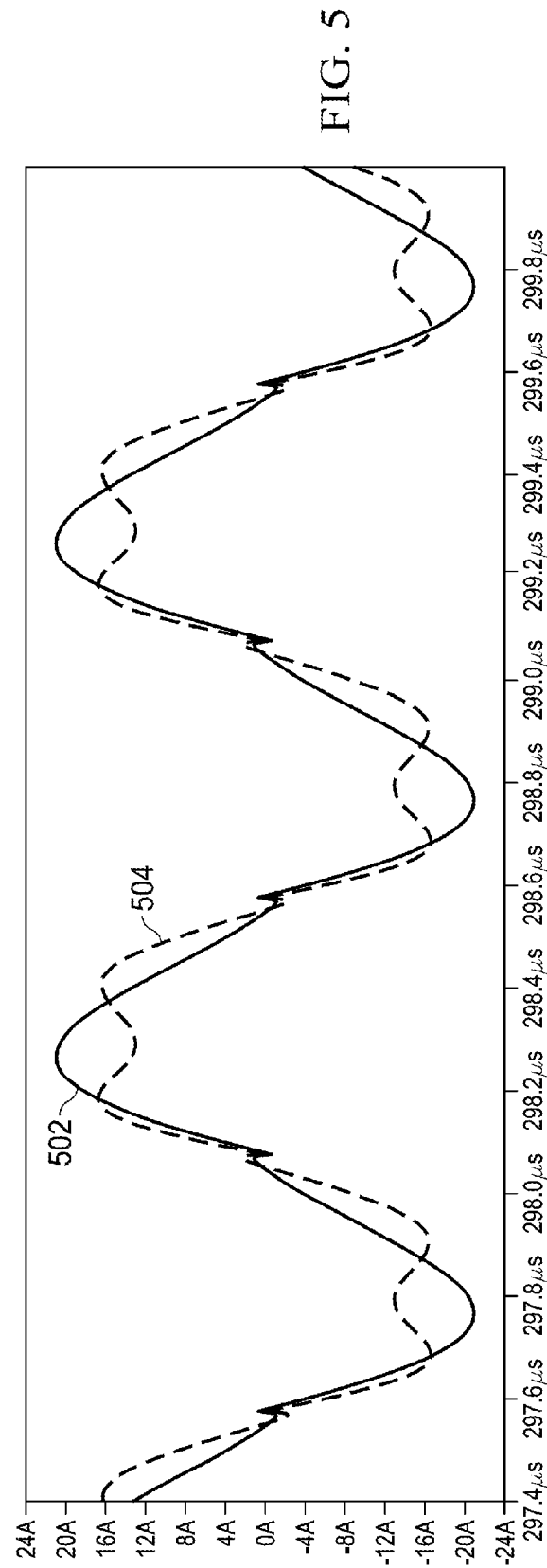
FIG. 5 illustrates current waveforms of an LLC resonant converter and a multiple constant gain resonant converter in accordance with various embodiments of the present disclosure.

FIG. 5 illustrates current waveforms of an LLC resonant converter and a multiple constant gain resonant converter in accordance with various embodiments of the present disclosure. A curve 502 illustrates the primary side current of an LLC resonant converter. In contrast, a curve 504 illustrates the primary side current of a multiple constant gain resonant converter operating under the same condition.

In some embodiments, the energy transferred to the output is proportional to the average primary side current. As shown in FIG. 5, the average primary side current of the multiple constant gain resonant converter is lower than the average primary side current of the LLC resonant converter. In addition, the peak current or the RMS value of the primary side current indicates the total conduction losses. As such, a ratio of the peak current of the primary side current to the average current of the primary side current indicates the efficiency of a power converter.

To reduce a ratio of the peak current of the primary side current to the average current of the primary side current, the following steps may be employed. In some embodiments, the resonant tank is so configured that the ratio can be improved. More particularly, a harmonic current can be created by reducing the impedance of the resonant tank at a selected frequency. As shown in FIG. 5, the curve 504 shows a harmonic current (e.g., $3^{rd}$ harmonic) is added upon the fundamental current.

In alternative embodiments, a $3^{rd}$ harmonic current can be injected into the multiple constant gain resonant converter. In particular, the secondary side switches such as S1 and S2 shown in FIG. 3 may be forced to generate a harmonic voltage. In other words, S1 and S2 do not form a synchronous rectifier.

By employing the multiple constant gain resonant converter, the primary side peak current as well as the primary side root-mean-square (rms) current of the full bridge converter may be reduced under the same operating conditions compared to commonly used LLC resonant circuits.

In accordance with some embodiments, as shown in FIG. 5, the primary side rms current is lowered from 13.7 A to 12.9 A. The primary side peak current is lowered from 20.9 A to 16.5 A.

In sum, one advantageous feature of having the multiple constant gain resonant converter 300 shown in FIG. 3 is that the multiple constant gain resonant tank helps to reduce the current stress of a full bridge converter. As a result, the efficiency of the full bridge converter can be further improved.

Figure 6:
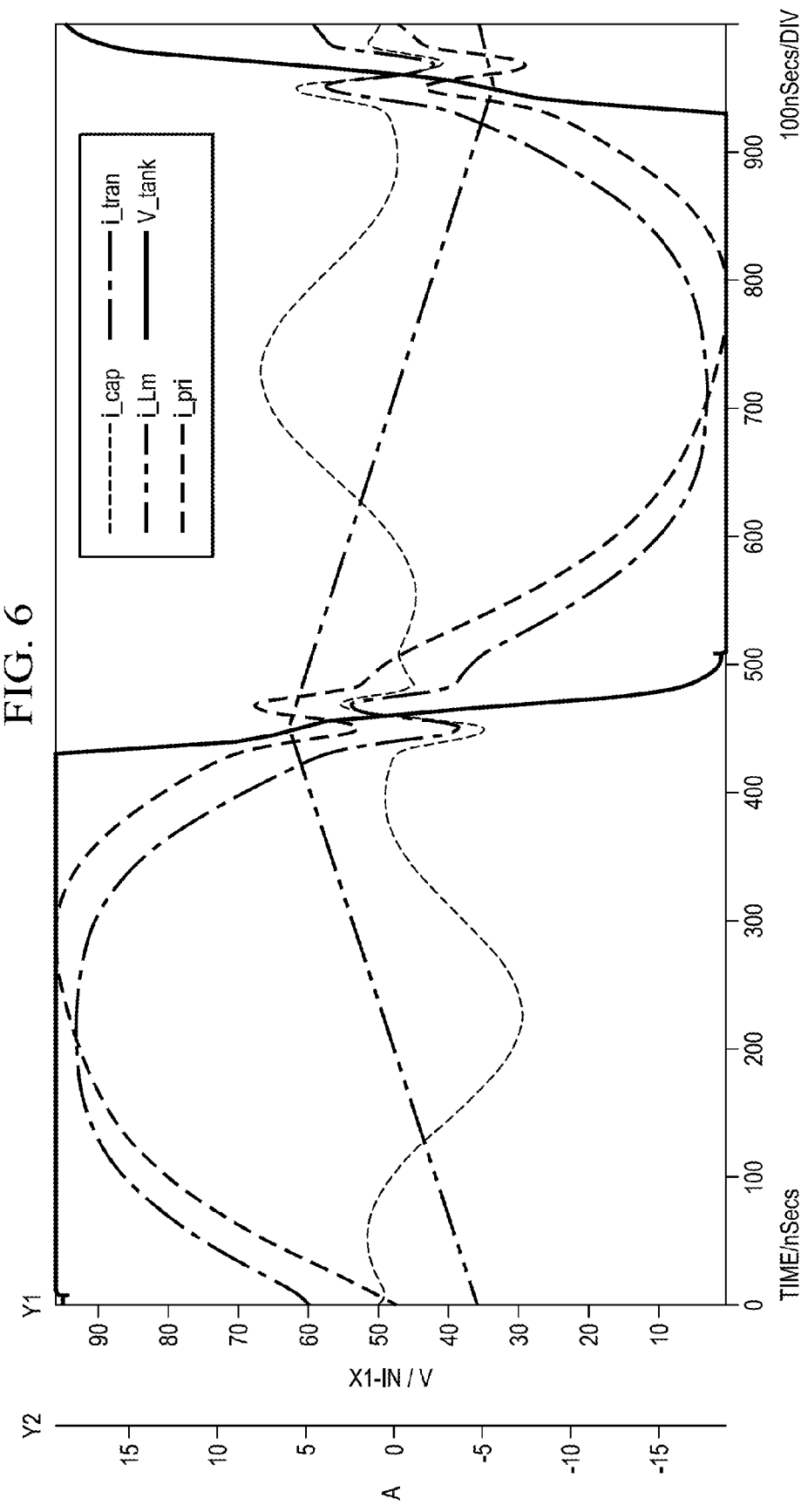
FIG. 6 illustrates various waveforms of the multiple constant gain resonant converter shown in FIG. 3 in accordance with various embodiments of the present disclosure.

FIG. 6 illustrates various waveforms of the multiple constant gain resonant converter shown in FIG. 3 in accordance with various embodiments of the present disclosure. In some embodiments, depending on design needs and different applications, either the primary side current or the secondary side may be improved by using the multiple constant gain resonant converter 300. For example, as shown in FIG. 6, the peak current of the secondary side current may be reduced by using the resonant tank shown in FIG. 3. In particular, in FIG. 6, i_pri represents the primary side current and i_tran represents the reflected secondary current. It should be noted that the reflected secondary current means it is reflected from the secondary side of the transformer to the primary side of the transformer.

As shown in FIG. 6, the peak of the reflected secondary current is lower than the primary side current. One advantageous feature of having the multiple constant gain resonant tank is that in the telecommunication industry, the secondary side current is much higher than the primary side current. The multiple constant gain resonant tank helps to reduce the peak of the secondary side current. As a result, the efficiency of the full bridge converter can be further improved.

FIG. 6 further illustrates the current i_cap flowing through the resonant capacitor, the current i_Lm flowing through the magnetizing inductance and the voltage V_tank across the resonant tank. From the current i_cap, its waveform includes a $3^{rd}$ harmonic current, which is generated by the resonant tank shown in FIG. 3.

Figure 7:
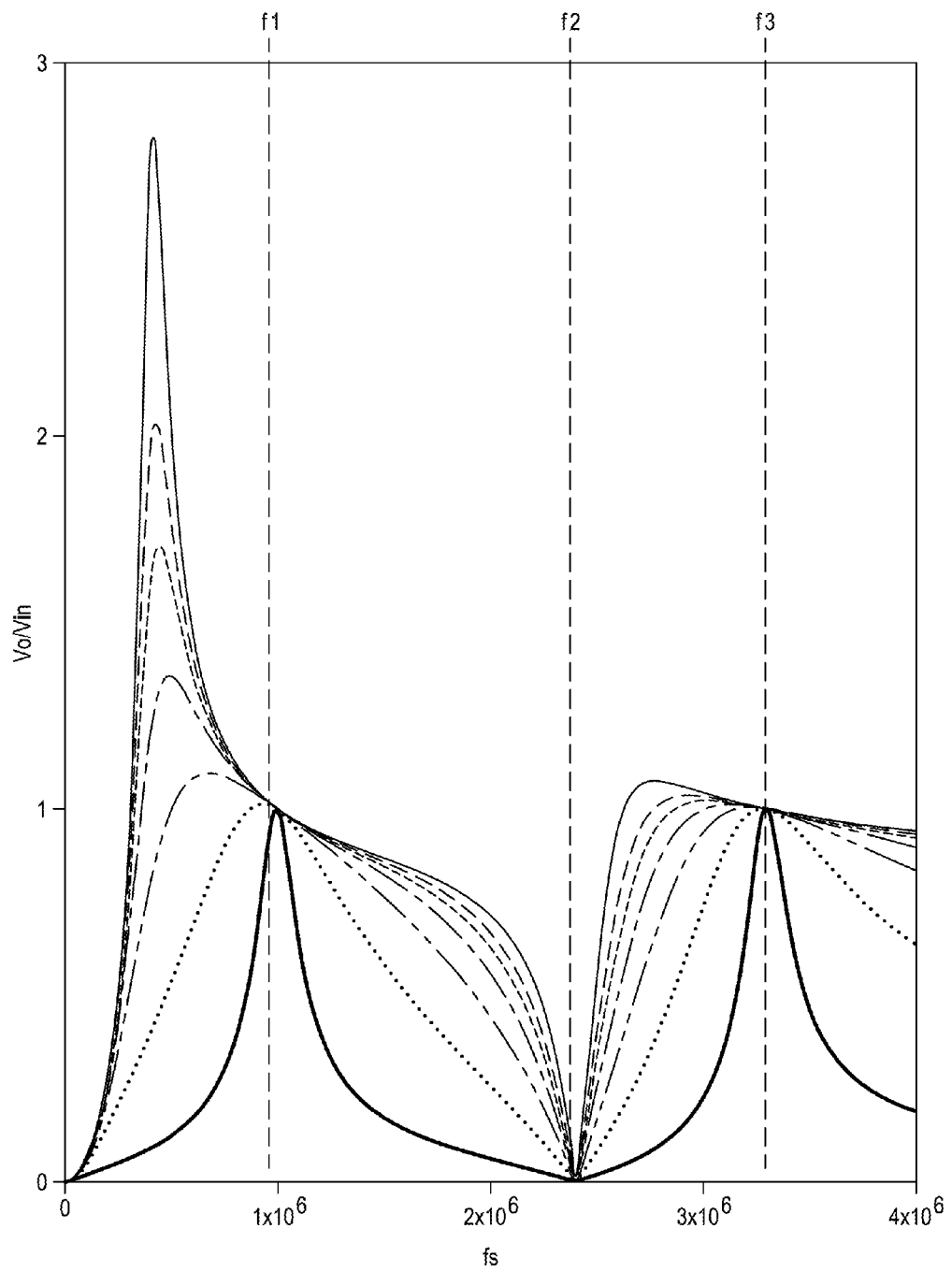
FIG. 7 illustrates the voltage gain of the resonant tank shown in FIG. 3 in accordance with various embodiments of the present disclosure.

FIG. 7 illustrates the voltage gain of the resonant tank shown in FIG. 3 in accordance with various embodiments of the present disclosure. The horizontal axis of FIG. 7 represents a switching frequency of the multiple constant gain resonant converter. The vertical axis of FIG. 7 represents a voltage gain of the multiple constant gain resonant. FIG. 7 includes a plurality of curves, which illustrate the voltage gain variations depending different loads. For example, at a light load, the voltage gain of the multiple constant gain resonant converter is greater than that of a full load.

FIG. 7 further illustrates three frequencies, namely f1, f2 and f3. Throughout the description, f1 is alternatively referred to as a first constant-gain resonant frequency. Likewise, f2 is alternatively referred to as a minimum-gain damping frequency and f3 is alternatively referred to as a second constant-gain resonant frequency.

In some embodiments, the first constant-gain resonant frequency is about 1 MHz. In addition, when a multiple constant gain resonant converter operates at the first constant-gain resonant frequency, the voltage gain of the multiple constant gain resonant converter is essentially insensitive to an output load change.

The minimum-gain damping frequency is about 2.5 MHz as shown in FIG. 7. Furthermore, when the multiple constant gain resonant converter operates at the minimum-gain damping frequency, the voltage gain of the power converter is approximately equal to zero. In other words, the resonant tank behaves as a notch filter circuit.

When the multiple constant gain resonant converter operates at the minimum-gain damping frequency, the impedance of the resonant tank becomes infinite. The resonant tank is connected between the output of the multiple constant gain resonant converter and the bridge of the multiple constant gain resonant converter. Such an infinite impedance causes the output voltage of the power multiple constant gain resonant converter to drop to a voltage level approximately equal to zero. This inherited impedance characteristic improves the current limiting capability of the multiple constant gain resonant converter.

It should be noted that the frequencies described above are merely an example. In some embodiments, a ratio of the minimum-gain damping frequency to the first constant-gain resonant frequency is in a range from about 1.5 to 3.

In some embodiments, the second constant-gain resonant frequency is about 3.5 MHz as shown in FIG. 7. Furthermore, FIG. 7 illustrates that the second constant-gain resonant frequency is higher than the minimum-gain damping frequency.

FIG. 7 shows the multiple constant gain resonant converter may be different voltage gain characteristics depending on different switching frequencies. As such, an advantageous feature of this embodiment is that the multiple constant gain resonant converter may be of a current limiting capability during a short circuit condition, an over-current condition and/or a startup process.

For example, the multiple constant gain resonant converter may operate at the minimum-gain damping frequency after a short circuit occurs. As such, the load current may be limited as the voltage gain drops to a level approximately equal to zero. The detailed description of such a current limiting capability will be described in further detail with respect to FIGS. 8-10.

Figure 8:
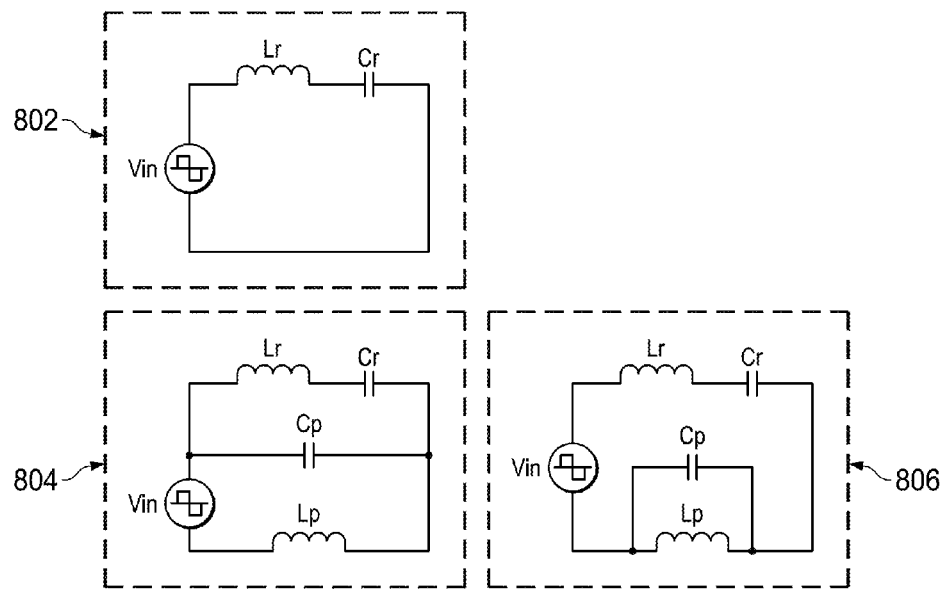
FIG. 8 illustrates short circuit equivalent circuits of an LLC resonant converter and a multiple constant gain resonant converter under short circuit conditions in accordance with various embodiments of the present disclosure.

FIG. 8 illustrates short circuit equivalent circuits of an LLC resonant converter and a multiple constant gain resonant converter under short circuit conditions in accordance with various embodiments of the present disclosure. The equivalent circuit 802 of an LLC converter includes an inductor and a capacitor connected in series. In contrast, the equivalent circuit (e.g., equivalent circuits 804 and 806) of a multiple constant gain resonant converter includes a combination of a first resonant device and a second resonant device, wherein the first resonant device includes an inductor Lr and a capacitor Cr connected in series, and the second resonant device includes an inductor Lp and a capacitor Cp connected in parallel.

The second resonant device may take a large portion of the voltage across the resonant circuit in short-circuit operations. As a result, the currents in the primary and secondary windings of the transformer may be significantly reduced. For example, if the converter operates in a frequency range approximately equal to the resonant frequency of the second resonant circuit in a short-circuit condition, the second resonant circuit behaves almost like an open circuit. Such an open circuit helps to reduce the current stress of the transformer windings. The second resonant circuit can also help to reduce the inrush current during a start-up process of the multiple constant gain resonant converter in a similar manner.

Figure 9:
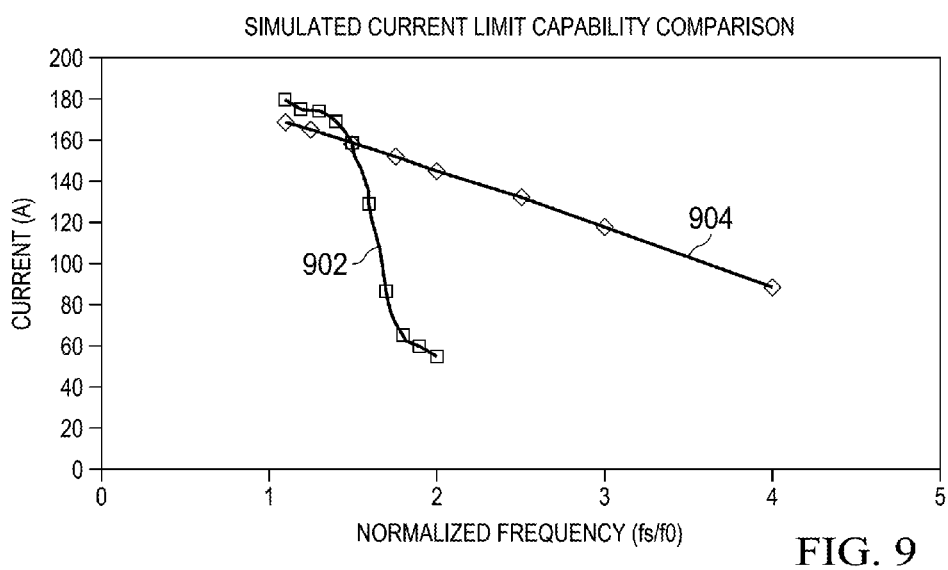
FIG. 9 illustrates a short circuit current limit comparison between the LLC resonant converter and the multiple constant gain resonant converter shown in FIG. 3 in accordance with various embodiments of the present disclosure.

FIG. 9 illustrates a short circuit current limit comparison between the LLC resonant converter and the multiple constant gain resonant converter shown in FIG. 3 in accordance with various embodiments of the present disclosure. A curve 904 illustrates the short circuit current of an LLC resonant converter. A curve 902 illustrates the short circuit current of a multiple constant gain resonant converter.

As shown in FIG. 9, the current limit of the multiple constant gain resonant converter is reduced as opposed to the current limit of an LLC converter. At a normalized frequency, the current limit of the multiple constant gain resonant converter is lowered from 140 A to 60 A.

Figure 10:
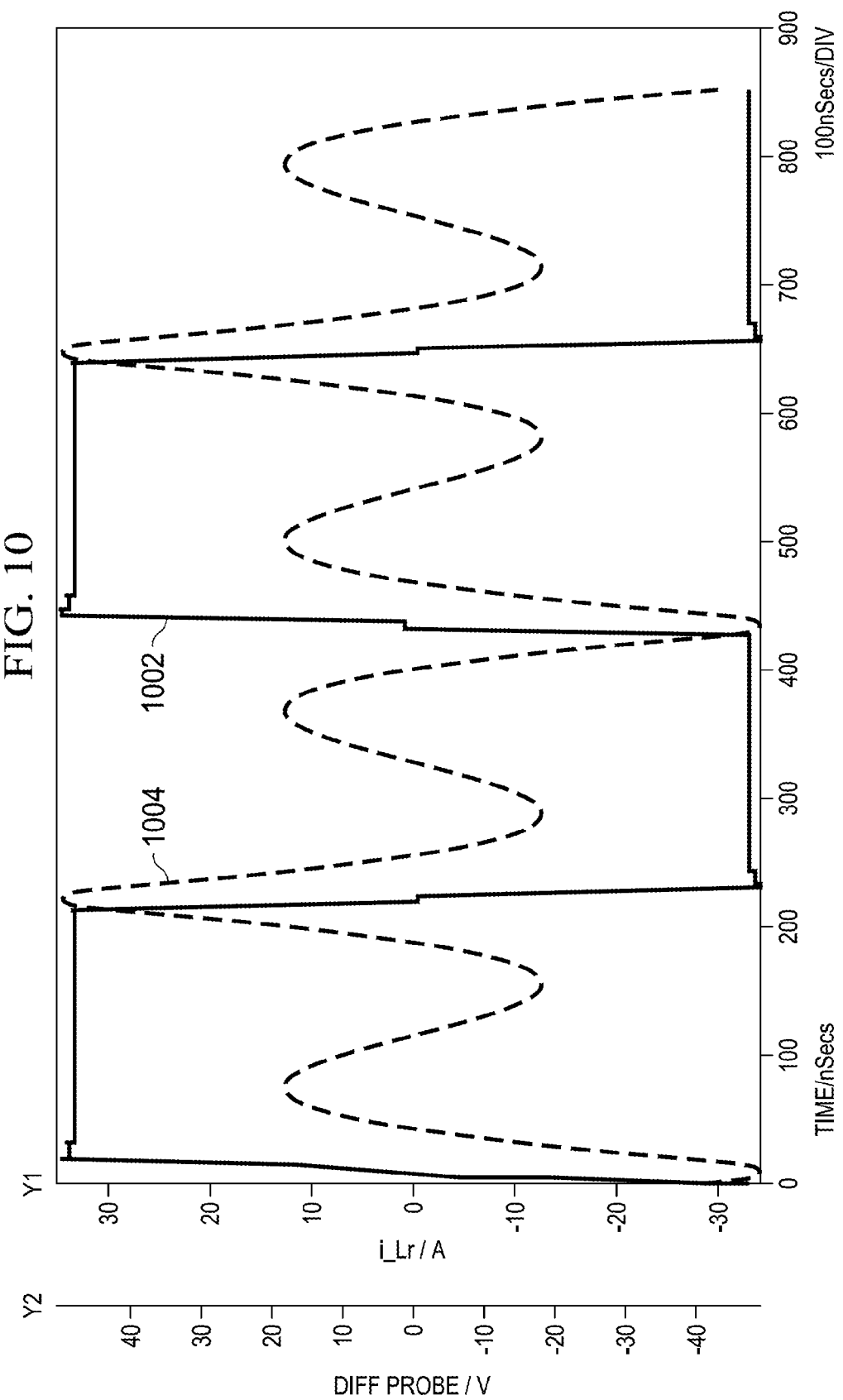
FIG. 10 illustrates the primary side current and voltage waveforms of a multiple constant gain resonant converter under short circuit condition in accordance with various embodiments of the present disclosure.

FIG. 10 illustrates the primary side current and voltage waveforms of a multiple constant gain resonant converter under short circuit condition in accordance with various embodiments of the present disclosure. The current waveform 1004 shows the primary side current of the multiple constant gain resonant converter includes a first frequency component and a second frequency component, wherein the second frequency is approximately equal to three times the first frequency. The primary voltage waveform 1002 shows a square waveform is across the primary side of the transformer.

Figure 11:
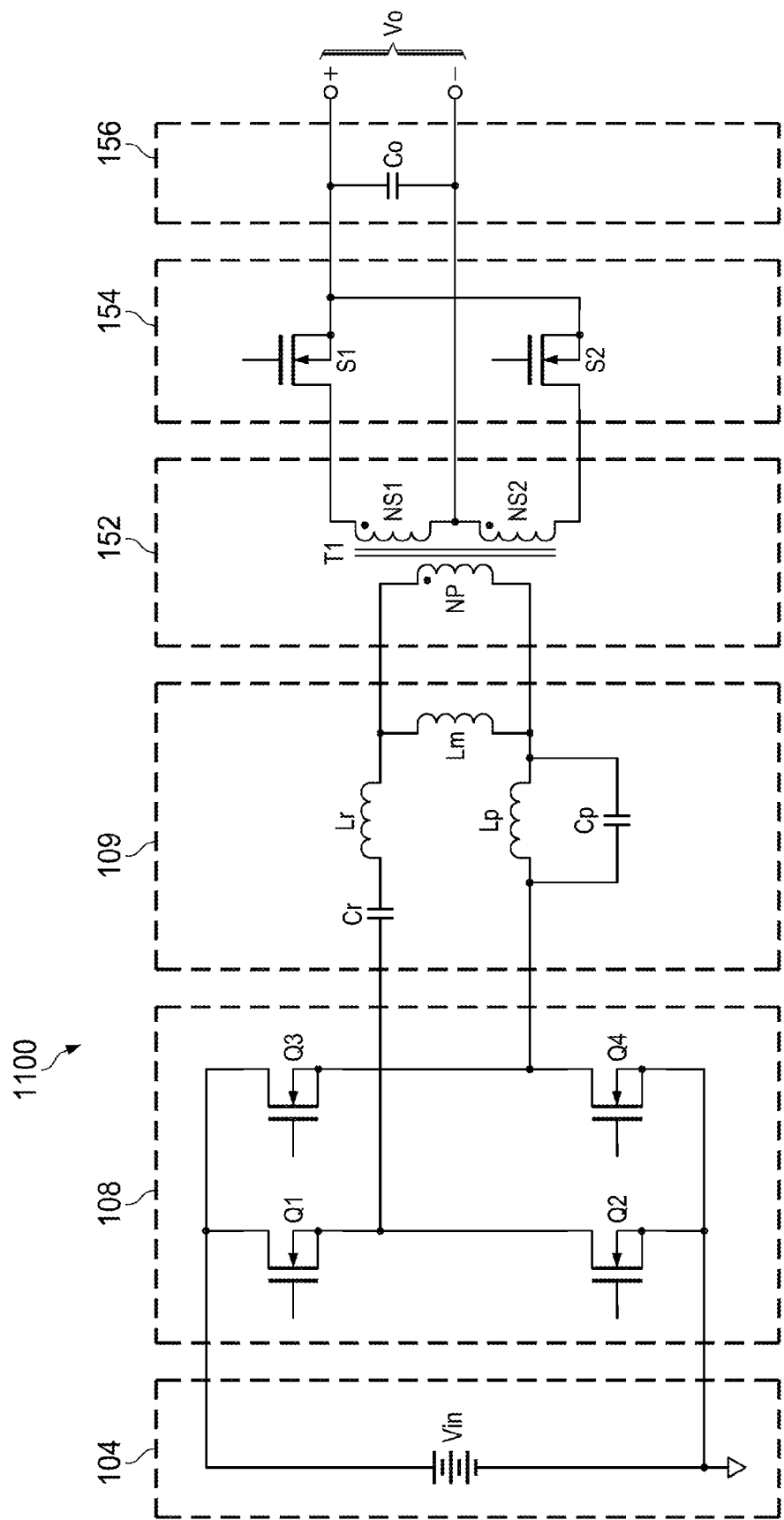
FIG. 11 illustrates a schematic diagram of a second illustrative embodiment of the multiple constant gain resonant converter shown in FIG. 2 in accordance with various embodiments of the present disclosure.

FIG. 11 illustrates a schematic diagram of a second illustrative embodiment of the multiple constant gain resonant converter shown in FIG. 2 in accordance with various embodiments of the present disclosure. The multiple constant gain resonant converter 1100 is similar to the multiple constant gain resonant converter 300 shown in FIG. 3 except that the resonant tank 109 may be of a different configuration of the resonant components. In particular, the resonant tank 109 includes Cr, Lr, Cp, Lp and Lm. As shown in FIG. 11, Cr and Lr are connected in series to form a series resonant device. Cp and Lp are connected in parallel to form a hybrid resonant device. The hybrid resonant device, the series resonant device and Lm are connected in series.

Figure 12:
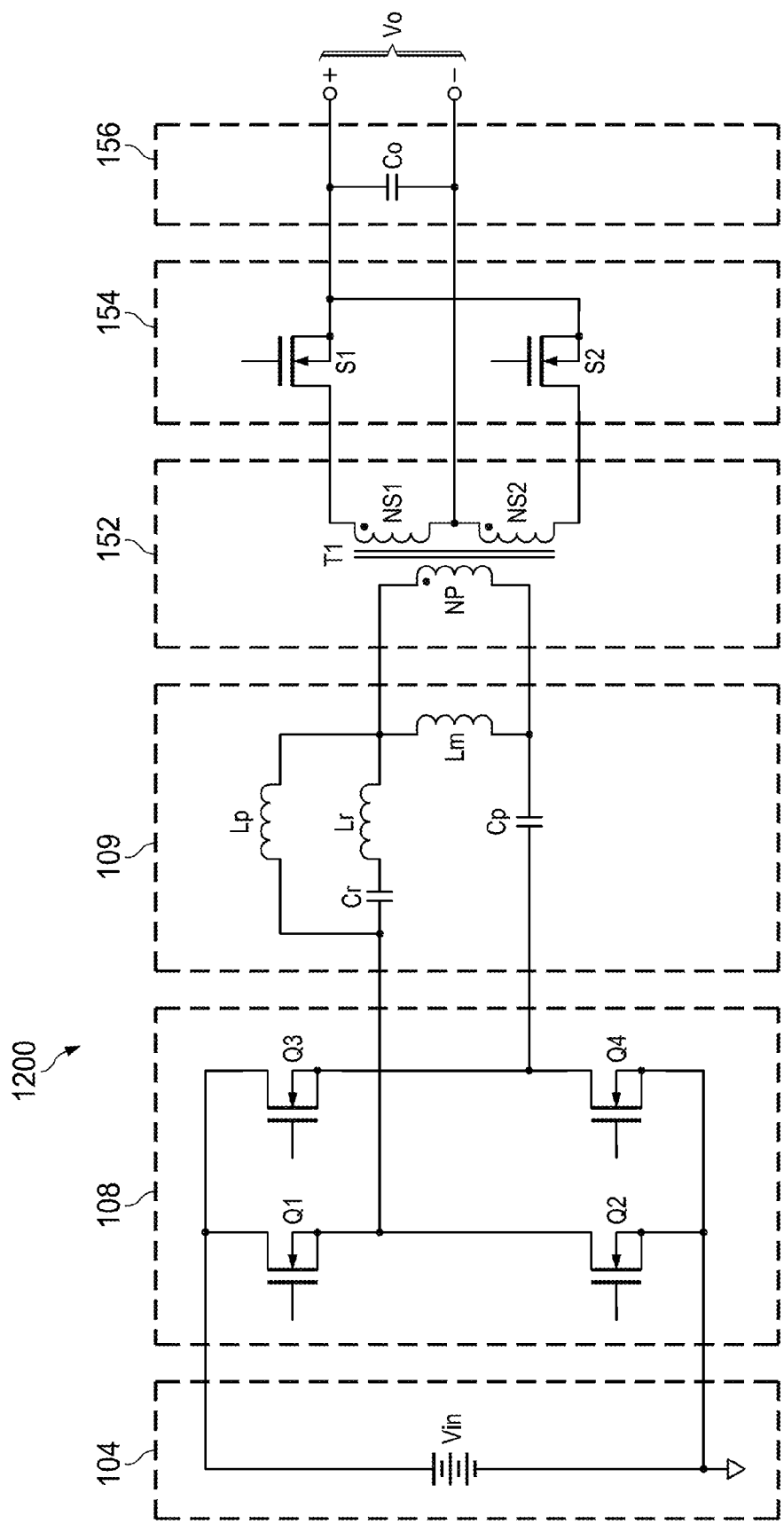
FIG. 12 illustrates a schematic diagram of a third illustrative embodiment of the multiple constant gain resonant converter shown in FIG. 2 in accordance with various embodiments of the present disclosure.

FIG. 12 illustrates a schematic diagram of a third illustrative embodiment of the multiple constant gain resonant converter shown in FIG. 2 in accordance with various embodiments of the present disclosure. The multiple constant gain resonant converter 1200 is similar to the multiple constant gain resonant converter 300 shown in FIG. 3 except that the resonant tank 109 may be of a different configuration of the resonant components. In particular, the resonant tank 109 includes Cr, Lr, Cp, Lp and Lm. As shown in FIG. 12, Cr and Lr are connected in series to form a series resonant device. The series resonant device is further connected with Lp in parallel to form a hybrid resonant device. The hybrid resonant device, Cp and Lm are connected in series.

Figure 13:
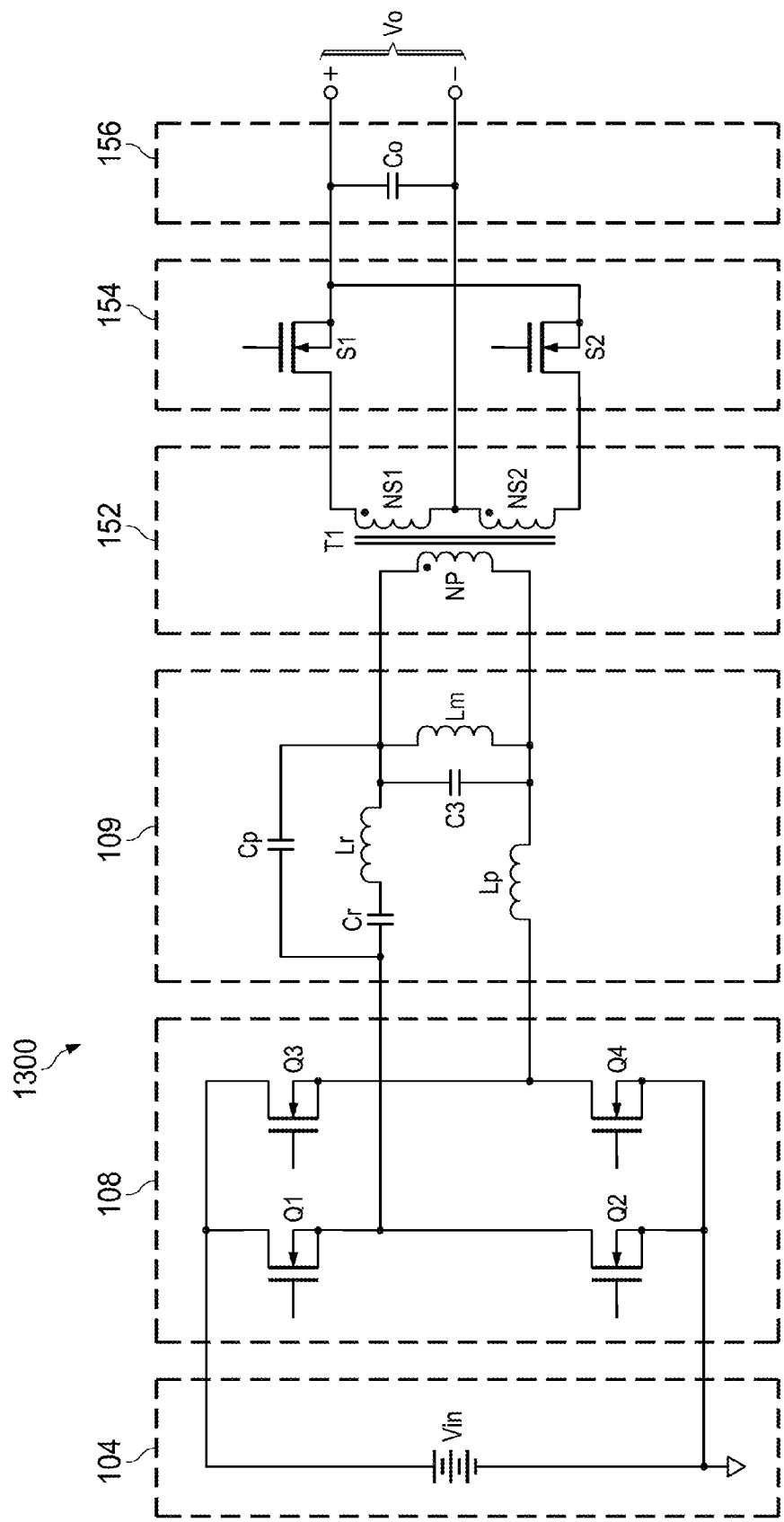
FIG. 13 illustrates a schematic diagram of a fourth illustrative embodiment of the multiple constant gain resonant converter shown in FIG. 2 in accordance with various embodiments of the present disclosure.

FIG. 13 illustrates a schematic diagram of a fourth illustrative embodiment of the multiple constant gain resonant converter shown in FIG. 2 in accordance with various embodiments of the present disclosure. The multiple constant gain resonant converter 1300 is similar to the multiple constant gain resonant converter 300 shown in FIG. 3 except that the resonant tank 109 may be of a different configuration of the resonant components. In particular, the resonant tank 109 includes Cr, Lr, Cp, Lp and C3. As shown in FIG. 13, Cr and Lr are connected in series to form a series resonant device. The series resonant device is further connected with Cp in parallel to form a hybrid resonant device. The hybrid resonant device, Lp and C3 are connected in series.

Figure 14:
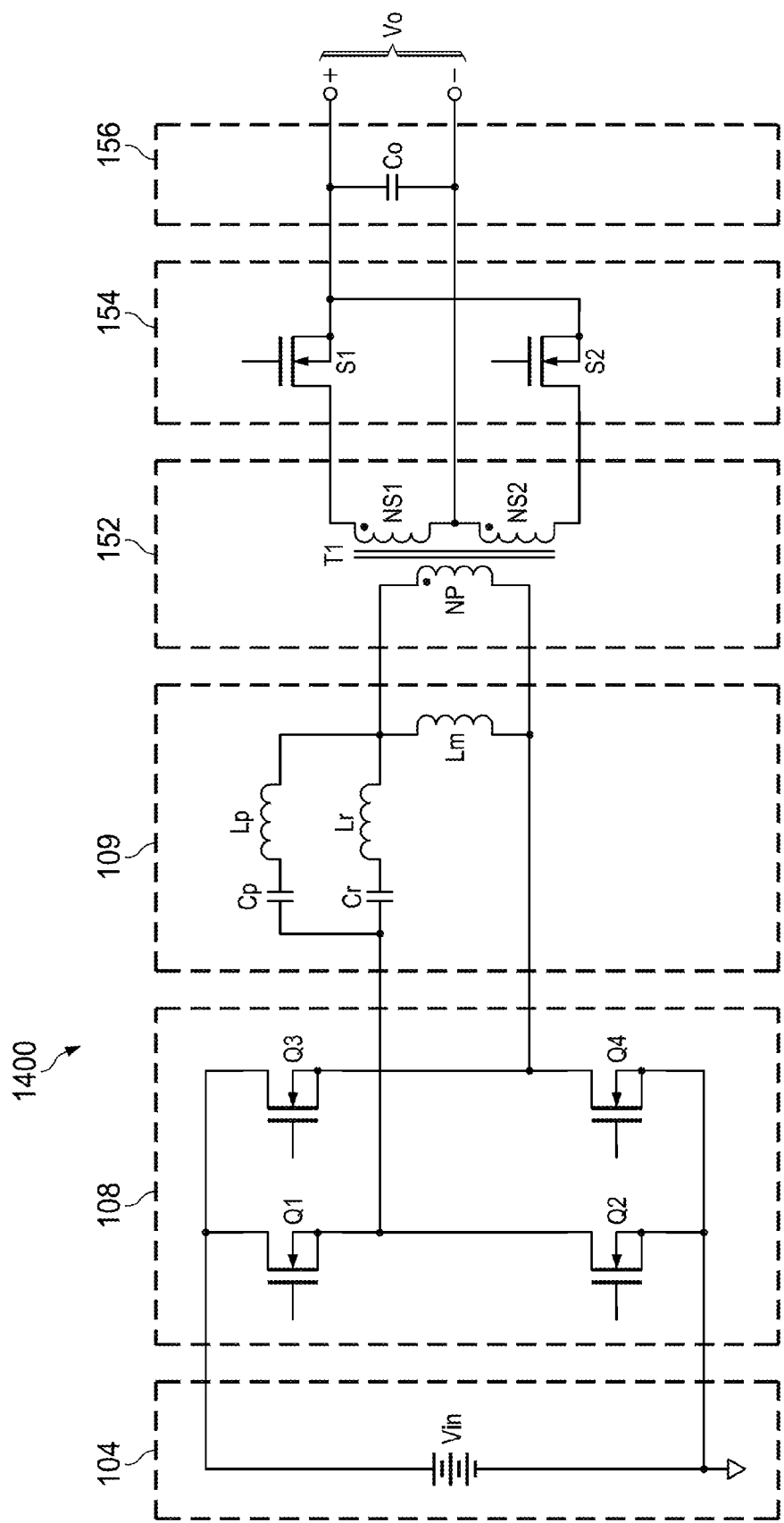
FIG. 14 illustrates a schematic diagram of a fifth illustrative embodiment of the multiple constant gain resonant converter shown in FIG. 2 in accordance with various embodiments of the present disclosure.

FIG. 14 illustrates a schematic diagram of a fifth illustrative embodiment of the multiple constant gain resonant converter shown in FIG. 2 in accordance with various embodiments of the present disclosure. The multiple constant gain resonant converter 1400 is similar to the multiple constant gain resonant converter 300 shown in FIG. 3 except that the resonant tank 109 may be of a different configuration of the resonant components. In particular, the resonant tank 109 includes Cr, Lr, Cp, Lp and Lm. As shown in FIG. 14, Cr and Lr are connected in series to form a first series resonant device. Cp and Lp are connected in series to form a second series resonant device. Furthermore, the first series resonant device is further connected with the second series resonant device in parallel to form a hybrid resonant device. The hybrid resonant device and Lm are connected in series.

Figure 15:
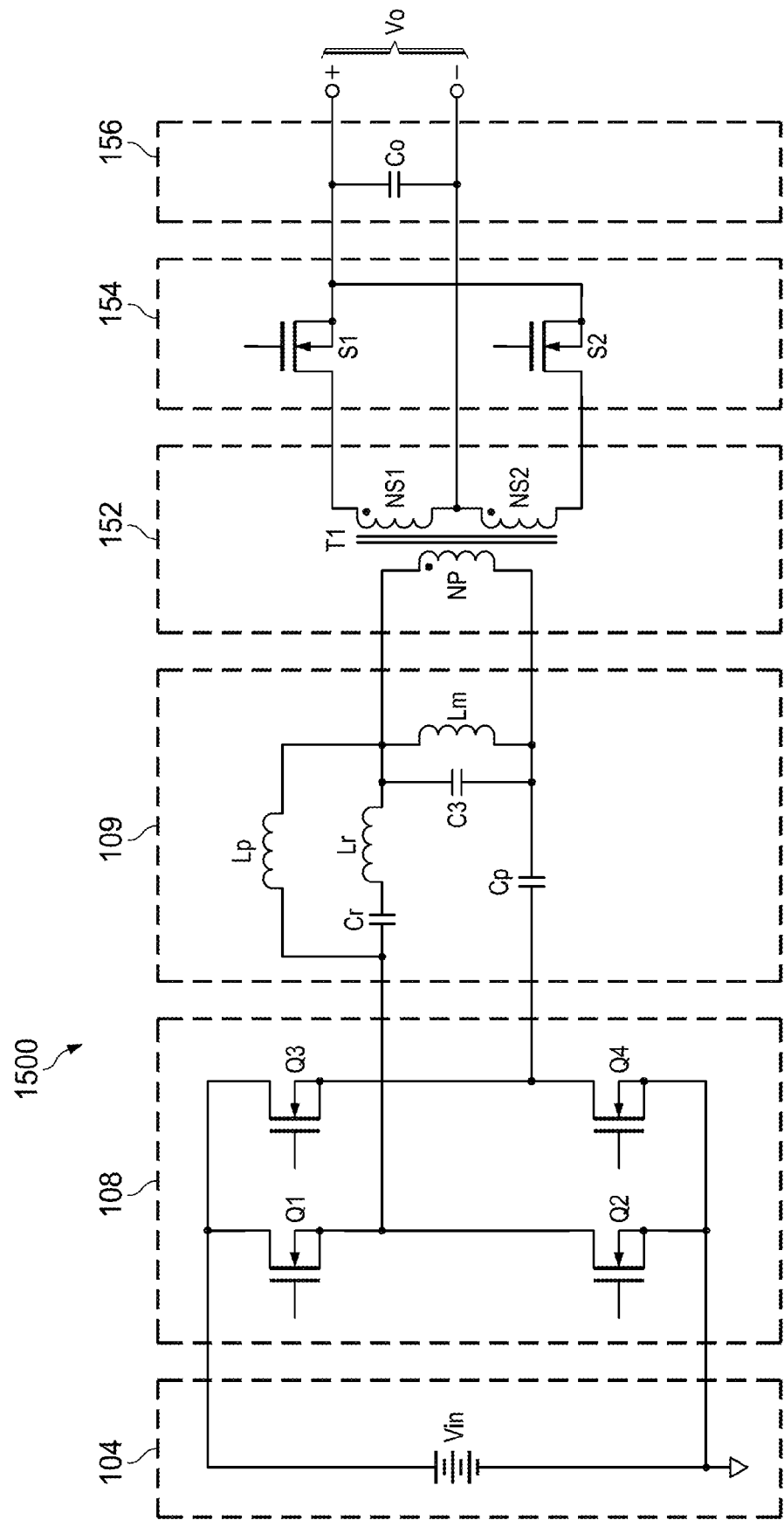
FIG. 15 illustrates a schematic diagram of a sixth illustrative embodiment of the multiple constant gain resonant converter shown in FIG. 2 in accordance with various embodiments of the present disclosure.

FIG. 15 illustrates a schematic diagram of a sixth illustrative embodiment of the multiple constant gain resonant converter shown in FIG. 2 in accordance with various embodiments of the present disclosure. The multiple constant gain resonant converter 1500 is similar to the multiple constant gain resonant converter 300 shown in FIG. 3 except that the resonant tank 109 may be of a different configuration of the resonant components. In particular, the resonant tank 109 includes Cr, Lr, Cp, Lp and C3. As shown in FIG. 15, Cr and Lr are connected in series to form a series resonant device. The series resonant device is further connected with Lp in parallel to form a hybrid resonant device. The hybrid resonant device, Cp and C3 are connected in series.

Figure 16:
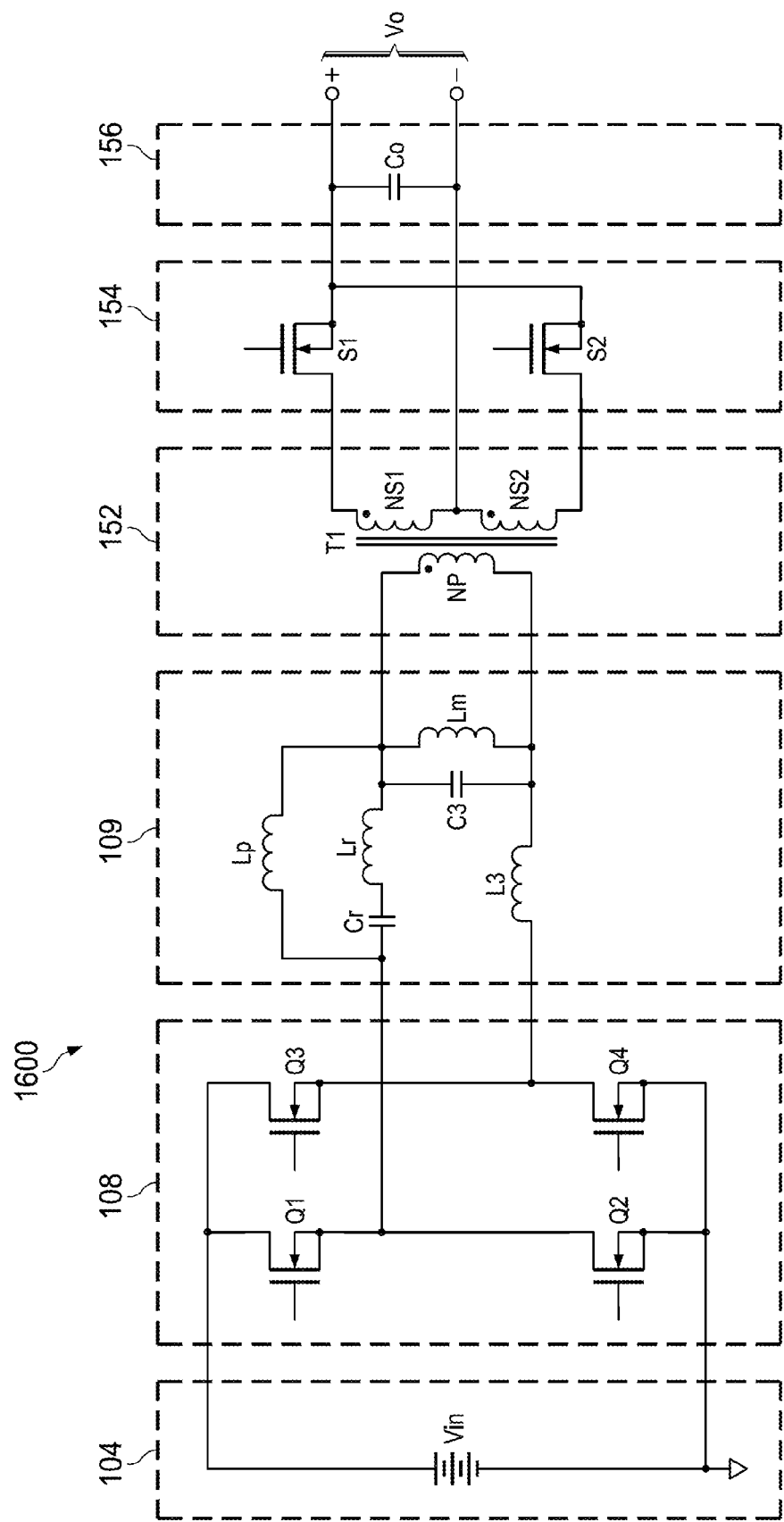
FIG. 16 illustrates a schematic diagram of a seventh illustrative embodiment of the multiple constant gain resonant converter shown in FIG. 2 in accordance with various embodiments of the present disclosure.

FIG. 16 illustrates a schematic diagram of a seventh illustrative embodiment of the multiple constant gain resonant converter shown in FIG. 2 in accordance with various embodiments of the present disclosure. The multiple constant gain resonant converter 1600 is similar to the multiple constant gain resonant converter 300 shown in FIG. 3 except that the resonant tank 109 may be of a different configuration of the resonant components. In particular, the resonant tank 109 includes Cr, Lr, L3, Lp and C3. As shown in FIG. 16, Cr and Lr are connected in series to form a series resonant device. The series resonant device is further connected with Lp in parallel to form a hybrid resonant device. The hybrid resonant device, C3 and L3 are connected in series.

Figure 17:
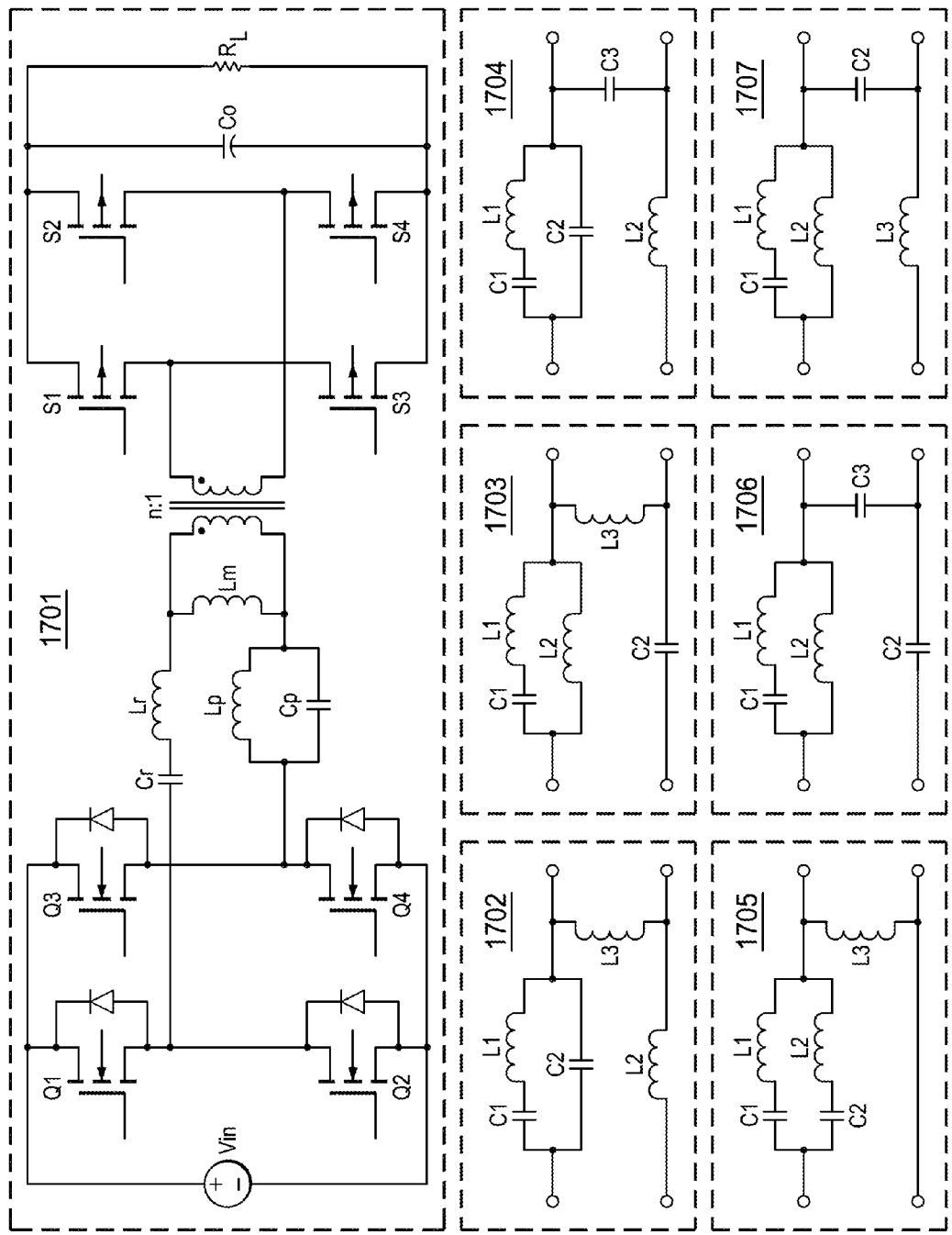
FIG. 17 illustrates schematic diagrams of a plurality of illustrative embodiments of the multiple constant gain resonant converter shown in FIG. 2 in accordance with various embodiments of the present disclosure.

FIG. 17 illustrates schematic diagrams of a plurality of illustrative embodiments of the multiple constant gain resonant converter shown in FIG. 2 in accordance with various embodiments of the present disclosure. The schematic diagram (e.g., the multiple constant gain resonant converter 1701) of FIG. 17 is similar to the schematic diagram shown in FIG. 11 except that a full wave rectifier is employed at the secondary side of the multiple constant gain resonant converter 1701. The full wave rectifier may help to further reduce the conduction losses as well as the switching losses of the full bridge converter so that the efficiency of the full bridge converter can be improved as a result.

The multiple constant gain resonant converter 1701 may include other resonant tanks such as resonant tanks 1702, 1703, 1704, 1705, 1706 and 1707. These resonant tanks have been described above, and hence are not discussed again herein.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A converter comprising:
a bridge including at least two switches coupled between an input voltage source and an isolation transformer;
a resonant tank coupled to the bridge comprising five resonant components, wherein:
the five resonant components are configured to provide:
a first constant-gain resonant frequency, and wherein a voltage gain of the converter is essentially insensitive to an output load change when the converter operates at the first constant-gain resonant frequency;
a minimum-gain damping frequency, and wherein a ratio of the minimum-gain damping frequency to the first constant-gain resonant frequency is in a range from about one and half to three and a voltage gain of the converter is approximately equal to zero when the converter operates at the minimum-gain damping frequency; and
a second constant-gain resonant frequency, and wherein the second constant-gain resonant frequency is higher than the minimum-gain damping frequency; and
a secondary rectifier coupled to the isolation transformer comprising at least two switches, wherein a dead time is placed between a first gate signal of a first switch of the secondary rectifier and a second gate signal of a second switch of the secondary rectifier.

2. The converter of claim 1, wherein:
the minimum-gain damping frequency is selected to modulate a harmonic current in the resonant tank so as to minimize a peak current of the converter when the converter operates under a short circuit condition.

3. The converter of claim 1, wherein:
the minimum-gain damping frequency is selected to modulate a harmonic current in the resonant tank so as to minimize output voltage ripples of the converter when the converter operates under a short circuit condition.

4. The converter of claim 1, wherein:
the secondary rectifier is a full-wave rectifier comprises four switches, and wherein the full-wave rectifier is coupled between a non-center tapped transformer and an output filter of the converter.

5. The converter of claim 1, wherein:
the five resonant components are two capacitors, two inductors and a magnetizing inductance of the transformer.

6. The converter of claim 1, wherein:
the five resonant components are two capacitors and three inductors.

7. The converter of claim 1, wherein:
the five resonant components are three capacitors and two inductors.

8. An apparatus comprising:
a resonant tank coupled between a bridge and a primary side of a transformer of a multiple constant gain resonant converter, wherein the resonant tank comprises:
   a first capacitor connected in series with a first inductor to form a first resonant device;
   a second capacitor connected in parallel with the first resonant device;
   a second inductor connected in series with the primary side of the transformer; and
   a magnetizing inductance of the transformer, and wherein the magnetizing inductance, the second inductor, the second capacitor and the first resonant device are configured such that the resonant tank provides:
      a first constant-gain resonant frequency, and wherein a voltage gain of the multiple constant gain resonant converter is essentially insensitive to an output load change when the multiple constant gain resonant converter operates at the first constant-gain resonant frequency;
      a minimum-gain damping frequency, and wherein a voltage gain of the multiple constant gain resonant converter is approximately equal to zero when the multiple constant gain resonant converter operates at the minimum-gain damping frequency; and
      a second constant-gain resonant frequency, and wherein the second constant-gain resonant frequency is higher than the minimum-gain damping frequency; and
a secondary rectifier coupled to a secondary side of the transformer, wherein a switching frequency of the secondary rectifier is approximately equal to the first constant-gain resonant frequency.

9. The apparatus of claim 8, wherein:
the switching frequency of the secondary rectifier is lower than the minimum-gain damping frequency in normal operation.

10. The apparatus of claim 8, wherein:
a ratio of the minimum-gain damping frequency to the first constant-gain resonant frequency is in a range from about one and half to three.

11. The apparatus of claim 8, wherein:
the secondary rectifier is coupled between a center tapped transformer and an output filter of the multiple constant gain resonant converter.

12. The apparatus of claim 8, wherein:
the secondary rectifier is a full-wave rectifier comprising four switching elements, wherein the full-wave rectifier is coupled between a non-center tapped transformer and an output filter of the multiple constant gain resonant converter.

13. The apparatus of claim 12, wherein:
the switching elements are selected from the group consisting of metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and any combinations thereof.

14. The apparatus of claim 8, wherein:
the bridge comprises a first switch, a second switch, a third switch and a fourth switch, and wherein:
   the first switch and the second switch are connected in series; and
   the third switch and the fourth switch are connected in series.

15. The apparatus of claim 14, wherein:
the first resonant device is coupled between a first terminal of the primary side of the transformer and a common node of the first switch and the second switch;
the second capacitor is coupled between the first terminal of the primary side of the transformer and the common node of the first switch and the second switch; and
the second inductor is coupled between a second terminal of the primary side of the transformer and a common node of the third switch and the fourth switch.

16. A method comprising:
providing a resonant tank coupled to a bridge and a primary side of a transformer of a power converter, wherein the resonant tank comprises:
   a first resonant component connected in series with a second resonant component to form a first resonant device;
   a third resonant component connected in parallel with the first resonant device;
   a fourth resonant component connected in series with the primary side of the transformer; and
   a fifth resonant component connected in parallel with the primary side of the transformer;
in a normal operation condition, configuring the power converter such that the power converter operates at a first constant-gain resonant frequency, wherein, at the first constant-gain resonant frequency, a voltage gain of the power converter is essentially insensitive to an output load change; and
in an abnormal operation condition, configuring the power converter such that the power converter operates at a minimum-gain damping frequency, wherein, at the minimum-gain damping frequency, a voltage gain of the converter is approximately equal to zero.

17. The method of claim 16, wherein:
the abnormal operation condition is a short circuit condition.

18. The method of claim 16, wherein:
the abnormal operation condition is a start-up process.

19. The method of claim 16, wherein:
a ratio of the minimum-gain damping frequency to the first constant-gain resonant frequency is in a range from about 1.5 to about 3.

20. The method of claim 16, further comprising:
configuring the power converter such that the power converter operates at a second constant-gain resonant frequency, wherein the second constant-gain resonant frequency is higher than the minimum-gain damping frequency.

* * * * *